Dec. 3, 1935.  K. MIDDELBOE ET AL  2,022,867
MACHINE FOR WEIGHING AND PACKING PULVERULENT MATERIAL
Filed Sept. 10, 1931  3 Sheets-Sheet 1
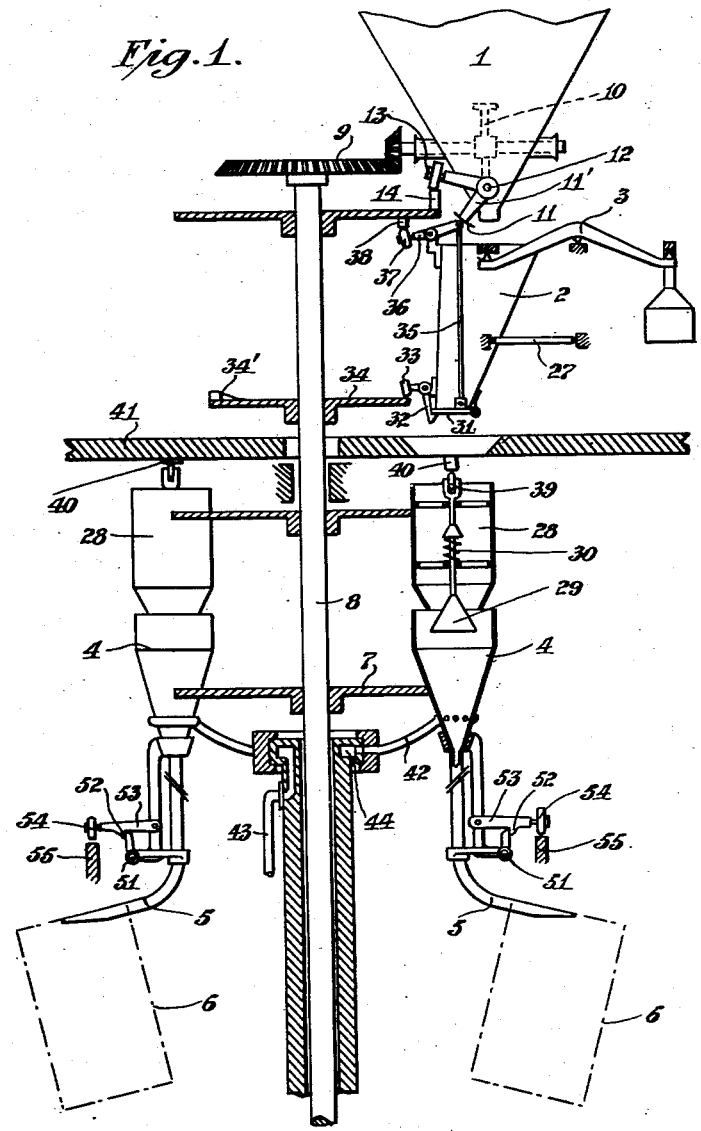

Dec. 3, 1935.   K. MIDDELBOE ET AL   2,022,867
MACHINE FOR WEIGHING AND PACKING PULVERULENT MATERIAL
Filed Sept. 10, 1931   3 Sheets-Sheet 2
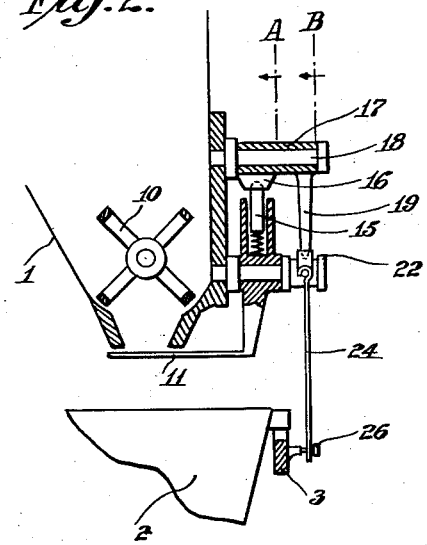
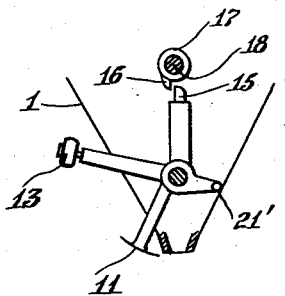
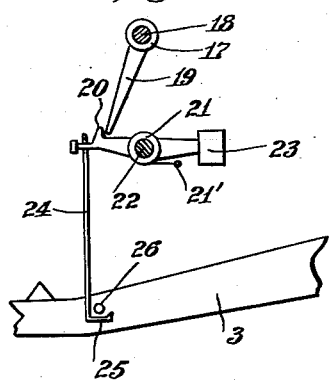
INVENTORS.
Kristian Middelboe
and Niels Nielsen
BY Redding, Greeley, O'Shea Campbell
ATTORNEYS.

Dec. 3, 1935.   K. MIDDELBOE ET AL   2,022,867
MACHINE FOR WEIGHING AND PACKING PULVERULENT MATERIAL
Filed Sept. 10, 1931   3 Sheets-Sheet 3
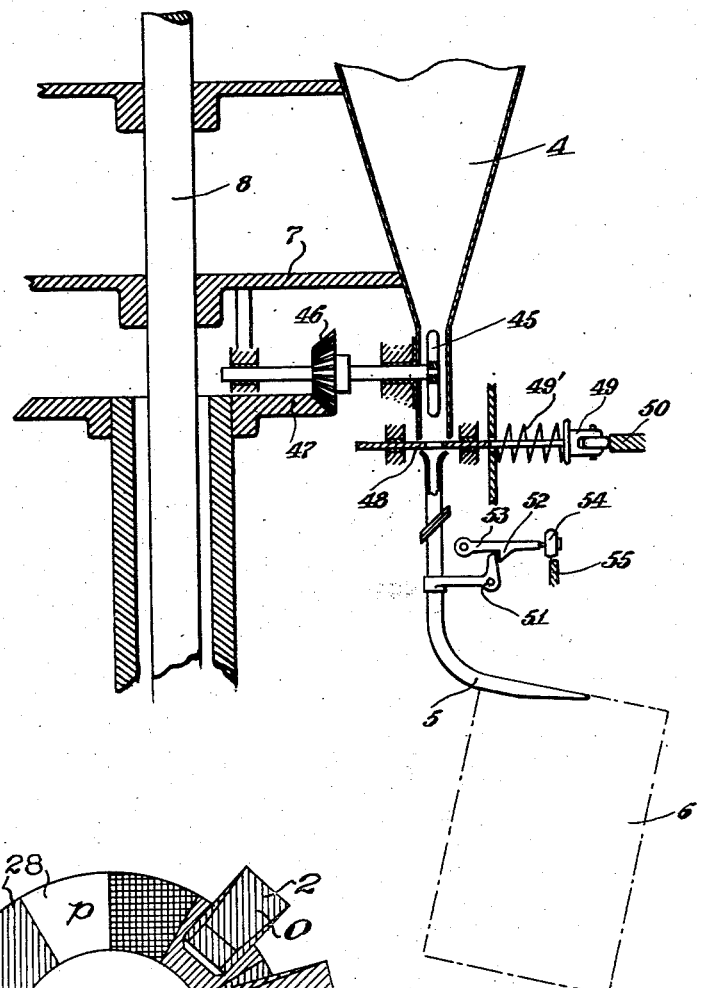
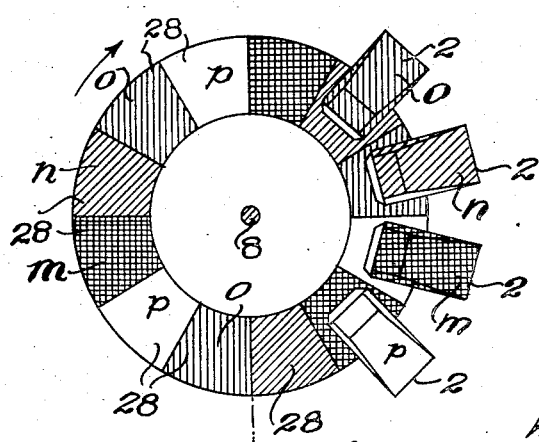

Patented Dec. 3, 1935

2,022,867

UNITED STATES PATENT OFFICE 2,022,867

MACHINE FOR WEIGHING AND PACKING PULVERULENT MATERIAL

Kristian Middelboe, Frederiksberg, near Copenhagen, and Niels Nielsen, Copenhagen, Denmark, assignors to F. L. Smidth & Co., New York, N. Y., a corporation of New Jersey Application September 10, 1931, Serial No. 562,048
In Great Britain April 2, 1931

9 Claims. (Cl. 249—17)

This invention relates to machines for weighing and packing pulverulent material, such as cement, such as are used for packing such material in bags with valve closures, and especially to machines of the rotary type in which a number of filling spouts, through which the material is supplied to the bags, are arranged about a vertical axis around which they revolve. In the operation of packing machines of this type high efficiency can be obtained, while manual attendance is confined to placing bags on the filling spouts as they pass the position of the attendant.

In rotary packing machines used hitherto, the weighing takes place either in the valve bag itself, which for this purpose is carried by a weighing device, or in separate tanks suspended from weighing mechanisms and from each of which the weighed quantity is discharged into the bags. The latter procedure offers advantages with regard to accuracy in weighing but renders the packing machine more complicated, as a separate weighing tank with associated weighing mechanism is required for each filling spout, and as the number of the spouts is large such a machine is expensive.

The object of the present invention is to simplify the construction of rotary packing machines and thus to render them less expensive. In the improved machine the material is first weighed in one or more weighing tanks, arranged in a stationary position and associated with weighing mechanism, and is then delivered to the bags in weighed quantities through filling spouts arranged to revolve about the axis of the packing machine.

The improved machine also includes devices for transferring the weighed quantity of material from the weighing tanks to the bags through the filling spouts, a tank, large enough to receive the amount of material which the bag is capable of containing, being placed above and in connection with each filling spout. The material is forced out through the filling spout into the bag in any suitable manner, as by compressed air or by a rotary impeller.

The invention will now be described with reference to the accompanying drawings wherein:—

Figure 1 is a view in vertical axial section of a machine which embodies the invention.

Figures 2, 3 and 4 are detail views of devices for regulating the supply of material to each weighing tank of the machine, Figures 3 and 4 being sections respectively on the lines A and B of Figure 2.

Figure 5 is a detail view of a modified construction of one of the filling and discharging devices for the bags, and Figure 6 is a diagrammatic plan view showing the relations of the revolving and stationary parts of the machine.

The material to be weighed and packed is discharged from a stationary supply tank 1 to a weighing tank 2 suspended from a weighing device 3, which, as shown in Figure 1, may be in the form of a counterbalanced lever having arms of equal length. From the weighing tank 2 the quantity of weighed material for filling a bag is delivered to the revolving parts of the machine. These comprise small filling tank members 4, arranged in a circle about the vertical axis of the machine, from the bottom of each of which there extends a filling spout 5. The tanks 4 are adapted to receive each the quantity of weighed material for filling a valve bag 6. The tanks 4 are supported by a structure 7, which is secured to a vertical shaft 8 rotated at such speed as to allow the attendant sufficient time to place the bags 6 on the filling spouts 5. To the upper end of the shaft 8 may be connected gearing 9 for driving a stirrer 10 which serves to keep the material in the lower part of the tank 1 in a fluent condition. The discharge of material from the tank 1 is controlled by a gate 11 carried by a two-armed lever 11' pivoted at 12 and having on one arm a roller 13 co-operating with a cam 14 which revolves with the shaft 8 for the purpose of opening the gate 11. The gate is held in the open position, as shown in Figures 2 and 3, by a spring-lifted stop 15 engaged by an arm 16 carried by a sleeve 17 mounted on a pin 18 projecting from the wall of the tank 1. The sleeve 17 is provided with a long arm 19 (see Figure 4) which engages a detent tooth 20 on a two-armed lever 21 pivoted at 22 on the tank 1 and at its opposite end provided with a counterweight 23 which causes the lever 21 normally to rest on a stop 21'. From the same end of the lever 21 at which the detent 20 is provided there is suspended a pull rod 24 which at its lower end has a hook 25 for engagement with a pin 26 on the weighing lever 3. When the lever 3 is over-balanced by the weight of the material in the bag the pin 26 pulls the rod 24 downwardly thus releasing the detent tooth 20 from the arm 19 and permitting the unbalanced lever 11' and the gate 11 automatically to cut off the supply of material to the weighing tank 2. The weighing tank 2 hangs freely while the weighing takes place, being suspended from the lever 3 and guided laterally by a pointed horizontal bar 27.

The discharge of the weighed amount of material from the weighing tank 2 into one of the tanks 4 must be completed at the time when an empty bag is placed on the corresponding filling spout. This discharge may be effected in various manners. In the construction shown, a secondary filling tank member 28 of substantially the same size as the filling tank member 4 is placed immediately above and in fixed relation with the filling tank member 4 of which it forms a part. The two parts are separated by a closing mechanism, so that the upper part 28, at any point during its revolution, can receive and retain material from the weighing tank 2 without interfering with the discharge from the lower tank part or member 4. The closing mechanism between the two parts or members and controlling the flow of material may be a conical valve 29 which is held closed by a spring 30. The material is discharged from the weighing tank 2 into the tank 28 at the moment when the latter, during its revolution, is located immediately below the outlet of the weighing tank. The discharge may take place through a movable bottom plate or gate 31 which, during the weighing, is kept closed by a pawl 32 co-operating therewith and actuated by a roller 33 and a cam 34' on a disc 34 carried by the rotary shaft 8, in such a manner that when the roller 33 is raised by the cam 34' the pawl 32 is disengaged from the bottom plate 31 at the moment that the tank 28 is below the weighing tank 2. The bottom plate 31 is closed after the discharge by a pull rod 35 connected to one end of a two-armed lever 36 of which the opposite end carries a roller 37 co-operating with a cam 38 connected to and revolving with the shaft 8.

The quantity of material weighed is discharged from the tank 28 into the tank 4 immediately after an empty bag 6 has been placed on the filling spout 5. The discharge may be effected by providing the spindle of the conical valve 29 at its upper end with a roller 39 which co-operates with a stationary cam 40 which may be placed on the underside of a horizontal partition 41. The weighed amount of material discharged from the tank 4 enters the bag 6 through the filling spout 5, and to ensure the rapid and complete delivery of the material the tank 4, as shown in Figure 1, may be supplied with compressed air through a pipe 42, which communicates through a gland 44 with a stationary pipe 43 for the supply of compressed air. The gland 44 is provided with ports so arranged that the supply of compressed air to the separate pipes 42 is permitted and stopped at the proper time.

The discharge of the weighed material from the tanks 4 may also be effected, as shown in Figure 5, by a rotary impeller 45 in the lower part of the tank 4. This impeller may be driven through gearing 46, 47, either as a result of the rotation of the packing machine, in which case the gear wheel 47 is stationary, or by driving the gear wheel 47. Between the impeller 45 and the outlet of the filling spout 5 there is provided a gate 48, actuated by a roller 49 and a stationary cam 50 in such a manner that the material is allowed to pass through the spout 5 immediately after an empty bag has been placed on the spout, the gate being closed by a spring 49' after the material has been discharged from the tank 4 and before this is refilled.

The bag 6, which is suspended on the filling spout 5, is disengaged from the spout after it has been filled. As shown, the lower portion of the spout is pivotally mounted, as at 51, and while the bag is being filled is held in the position shown by a pawl 52 carried by a lever 53. The lever 53 is pivotally mounted at one end and at the other end carries a roller 54 co-operating with a stationary cam 55 in such a manner that, during the rotation of the machine and when the bag has been filled, the pawl 52 releases the lower part of the filling spout so that this swings on its pivot 51 and discharges the filled bag. The vertical portion of the filling spout is cut on an oblique line, as shown in Figures 1 and 5, so as to permit the lower part to swing, the upper part being held in fixed position.

In Figure 6, which is a diagrammatic plan view showing the relations of the stationary and movable parts of the machine, four weighing tanks 2 are indicated in relation to twelve revolving tanks 28. The number of revolving tanks 28 should be a multiple of the number of weighing tanks 2, the weighing tanks 2 marked $m$, $n$, $o$, and $p$ being adapted to discharge into corresponding tanks 28. The cams 14, 38, 34 for the rollers, 13, 37 and 33 are so arranged that the weighing tank 2, in position $m$ discharges into the corresponding tank $28^m$, the weighing tank in position $n$ into the corresponding tank 28, and so on. The requisite number of weighing tanks 2 depends upon the speed at which an exact weighing of the quantity of material filled into each bag can be obtained, and the output required of the machine.

The operation of the machine above described is as follows:

It is assumed that the attendant is standing at the point X (Figure 6) where he applies the empty bags to the filling spouts 5 as these move past him. The pulverulent material to be introduced into the bags is placed in the supply tank 1 where it is maintained in a fluent condition by the stirrer 10. At the proper time the gate 11 is opened and the material flows into the weighing tank 2, the bottom thereof being closed by the gate 31. When the predetermined weight of material has flowed into the tank 2 the gate 11 is closed, shutting off the flow of material into the tank 2, and thereafter the gate 31 is opened and the material flows into the upper part 28 of the filling tank, where it is retained until the material is to be discharged into a bag on the filling spout, being so retained by the closure 29 which is a feature of the filling tank. Shortly after the bag has been applied to the spout the closure 29 is opened automatically by the cam 40 so that the quantity of material flows down into the lower part 4 of the filling tank whereupon the closure 29 is closed by the spring 30. Compressed air is then admitted into the lower part of the filling tank, at its tapered lower end, where it mingles with the material and renders it sufficiently fluent to flow freely from the tank into the bag which then hangs on the filling spout or, as shown in the modification illustrated in Figure 5, the gate 48 in the filling spout is opened and the material, rendered fluent by the stirrer 45, flows into the bag. Shortly before the bag reaches the position X of the attendant the filling has been completed and the roller 54 is lifted by the cam 55, so that the pawl 53 releases the filling spout and the bag is discharged from the machine.

It will be understood that various changes may be made to suit different conditions of operation and that the invention is not restricted to the construction shown and described except as pointed out in the accompanying claims.

We claim as our invention:

1. A machine for weighing and packing pulverulent materials, comprising a relatively stationary weighing tank, weighing mechanism associated therewith, a filling tank, having a closure and adapted to receive and retain a weighed quantity of the material, the filling tank being provided with a delivery spout and means to receive a bag to be filled, means to discharge the filled bag, means to revolve the filling tank about the axis of the machine, means for delivering the material to the weighing tank, and means for delivering the material in weighed quantity from the weighing tank to the filling tank.

2. A machine for weighing and packing pulverulent materials, comprising a supply tank, a relatively stationary weighing tank, means to control the delivery of the material from the supply tank to the weighing tank, weighing mechanism associated with the weighing tank, a filling tank, having a closure and adapted to receive and retain a weighed quantity of the material, the filling tank being provided with a delivery spout and means to receive a bag to be filled, means to discharge the filled bag, means to revolve the filling tank about the axis of the machine, means for delivering the material to the weighing tank, and means for delivering the material in weighed quantity from the weighing tank to the filling tank.

3. A machine for weighing and packing pulverulent materials, comprising a supply tank, a relatively stationary weighing tank, a gate in operative relation with the supply tank to control the delivery of material from the supply tank to the weighing tank, overbalanced means tending normally to close the gate, means to open the gate, weighing mechanism associated with the weighing tank, a filling tank, having a closure and adapted to receive and retain a weighed quantity of the material, the filling tank being provided with a delivery spout and means to receive a bag to be filled, means to discharge the filled bag, means to revolve the filling tank about the axis of the machine, means for delivering the material to the weighing tank, and means for delivering the material in weighed quantity from the weighing tank to the filling tank.

4. A machine for weighing and packing pulverulent materials, comprising a relatively stationary weighing tank, weighing mechanism associated therewith, a filling tank, having a closure and adapted to receive and retain a weighed quantity of the material, the filling tank being provided with a delivery spout and means to receive a bag to be filled, means to discharge the filled bag, means to revolve the filling tank about the axis of the machine, a gate in operative relation with the weighing tank to control the delivery of the material from the weighing tank, other means to release the gate at a predetermined time, and means for delivering the material to the weighing tank.

5. A machine for weighing and packing pulverulent materials, comprising a relatively stationary weighing tank, weighing mechanism associated therewith, a filling tank member, means to revolve the filling tank about the axis of the machine, a secondary tank member interposed between the weighing tank and the filling tank member and revolving therewith, and means to control the delivery of the material from the secondary tank member to the filling tank.

6. A machine for weighing and packing pulverulent materials, comprising a weighing tank, weighing mechanism associated therewith, a filling tank, means to revolve the filling tank about the axis of the machine, a secondary tank interposed between the weighing tank and the filling tank, a valve to control the delivery of the material from the secondary tank to the filling tank, and means actuated in the revolution of the secondary tank and filling tank to open said valve.

7. A machine for weighing and packing pulverulent materials, comprising a relatively stationary weighing tank, weighing mechanism associated therewith, a filling tank, means to revolve the filling tank about the axis of the machine, means to deliver the material to the filling tank, a filling spout to receive and support the bag to be filled, means to discharge the filled bag, and means to supply air under pressure to the filling tank to discharge the material therefrom.

8. A machine for weighing and packing pulverulent materials, comprising a relatively stationary weighing tank, a plurality of filling tanks, means to revolve the filling tanks about the axis of the machine, a closure for each filling tank, means to control the closure, a gate in operative relation with the weighing tank to control the delivery of the material from the weighing tank, means to retain the gate normally in c'osed position, and other means acting at a predetermined time in the rotation of the machine to effect the release of the gate.

9. A machine for weighing and packing pulverulent materials, comprising a relatively stationary weighing tank, a plurality of filling tanks, means to revolve the filling tanks about the axis of the machine, a gate in operative relation with the filling tank to control the delivery of the material from the filling tank, means to retain the gate normally in closed position, and other means acting at a predetermined time in the rotation of the machine to effect the release of the gate.

KRISTIAN MIDDELBOE.
NIELS NIELSEN.